Oct. 24, 1967 P. R. PORATH ETAL 3,348,912
METHOD OF PREPARING MANGANESE SULFATE FROM PYRITE
REDUCED MANGANESE DIOXIDE ORES
Filed Sept. 23, 1963 2 Sheets-Sheet 1
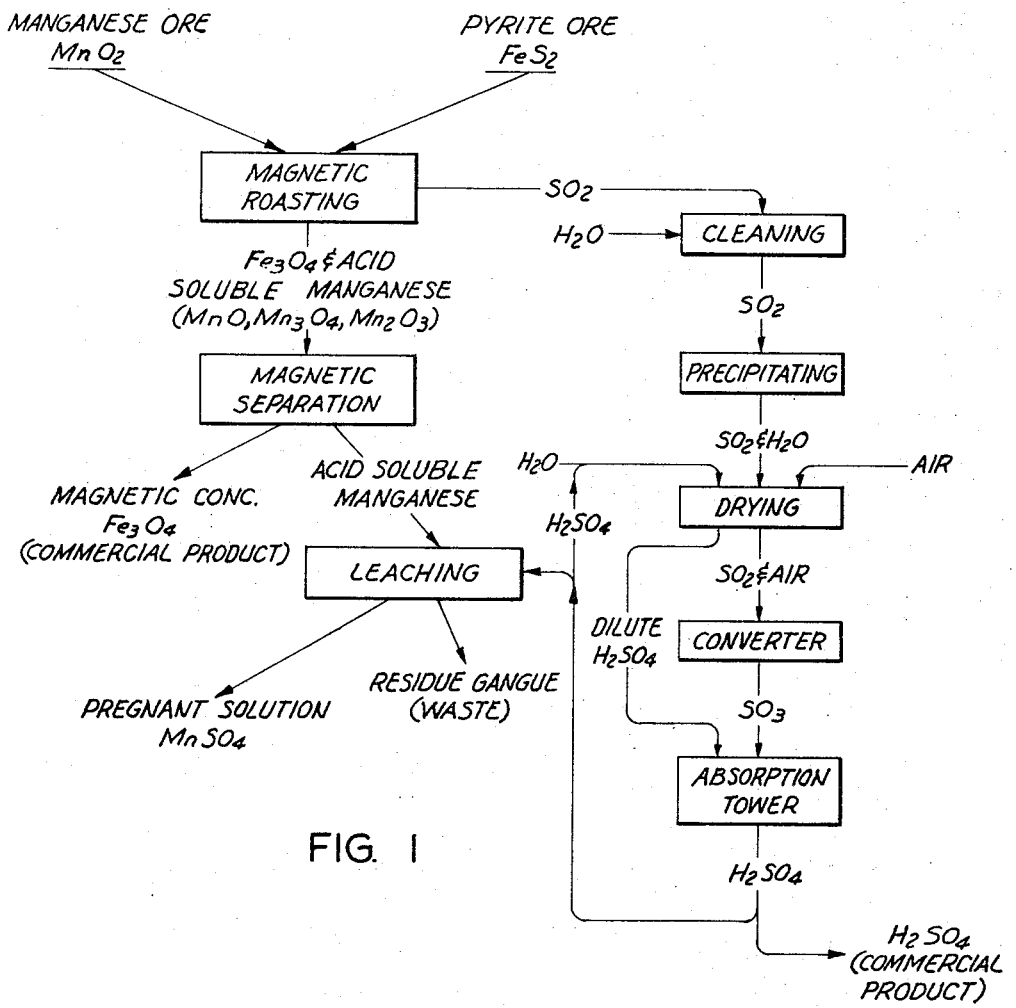
FIG. 1
FIG. 5
INVENTORS.
PHILLIP R. PORATH
MICHAEL H. PETTIBONE
BY
ATTORNEYS Oct. 24, 1967  P. R. PORATH ET AL  3,348,912
METHOD OF PREPARING MANGANESE SULFATE FROM PYRITE
REDUCED MANGANESE DIOXIDE ORES
Filed Sept. 23, 1963  2 Sheets-Sheet 2
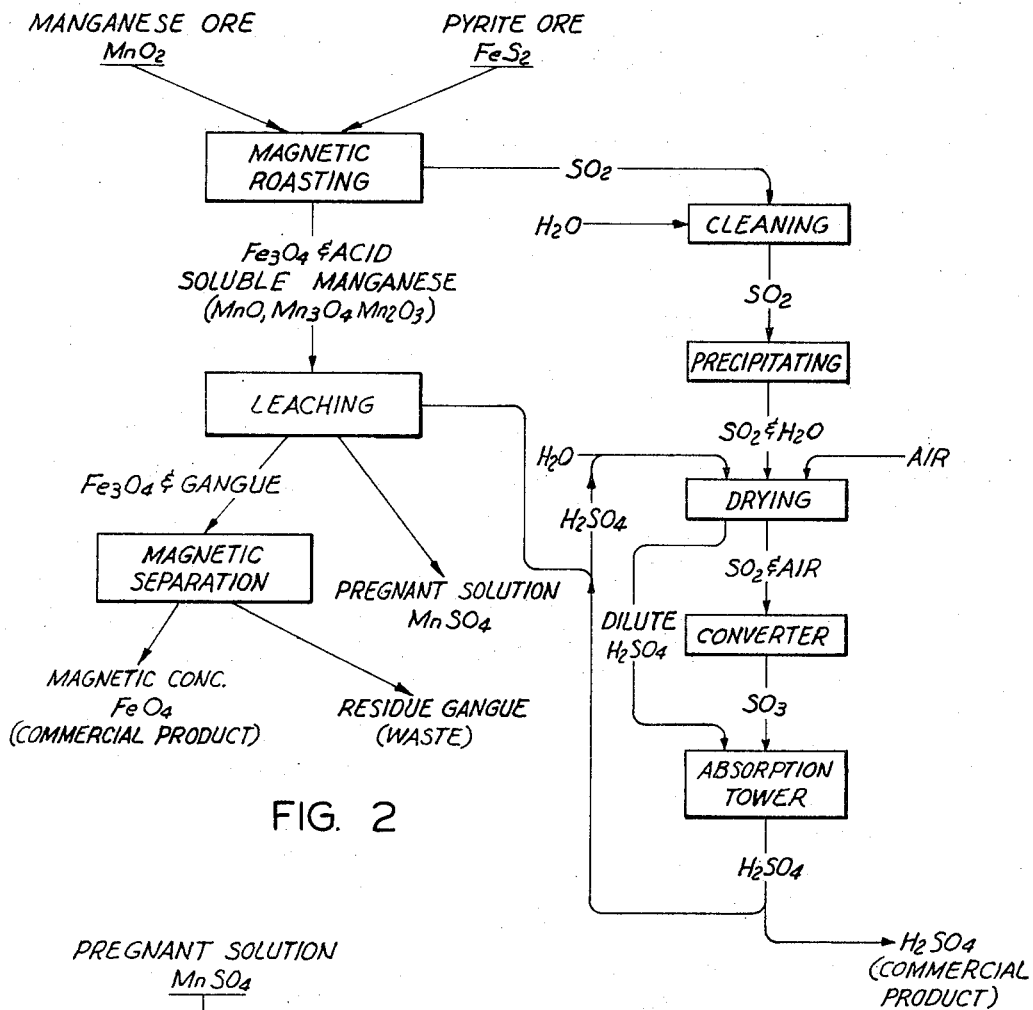
FIG. 2
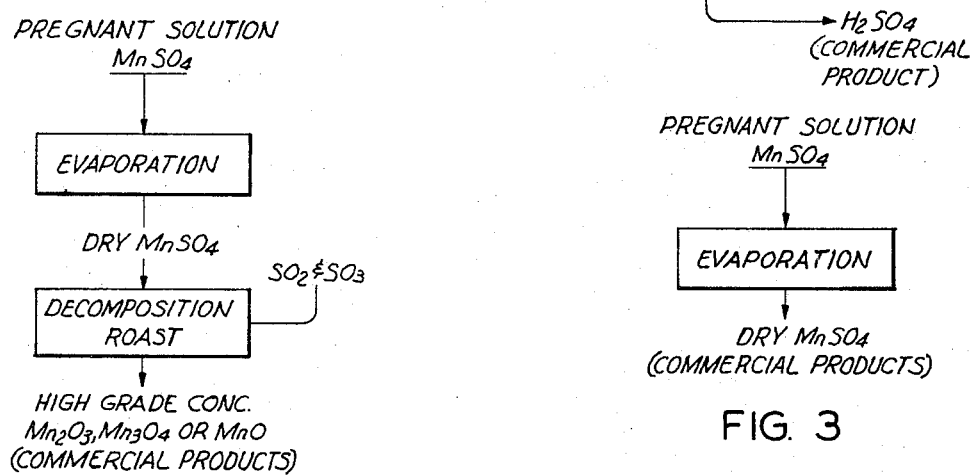
FIG. 4
FIG. 3
INVENTORS.
PHILLIP R. PORATH
MICHAEL H. PETTIBONE
*Flehr & Swain*
ATTORNEYS

United States Patent Office 3,348,912
Patented Oct. 24, 1967

3,348,912
METHOD OF PREPARING MANGANESE SULFATE FROM PYRITE REDUCED MANGANESE DIOXIDE ORES
Phillip R. Porath, Los Altos, and Michael H. Pettibone, Palo Alto, Calif., assignors to Utah Construction & Mining Co., San Francisco, Calif., a corporation of Delaware
Filed Sept. 23, 1963, Ser. No. 310,639
4 Claims. (Cl. 23—117)

This invention relates to reduction of manganese ore and particularly to the reduction roasting of such ore employing a sulfur medium such as pyrite or another sulfur bearing ore or even elemental sulfur as both fuel and reducing agent.

It is well known that there are substantial deposits of low grade manganese ore in the United States and this is usually in the form of manganese dioxide, $MnO_2$.

In many countries outside of the United States manganese ore has a much higher content of manganese—in the order of 50%. Consequently, much of the manganese ore in the United States goes unused due to the fact that it is cheaper to import the ore from abroad than it is to upgrade the local ore to equivalent commercial percentage of manganese. Although there are methods, at the present time, for upgrading manganese ore, these methods are expensive and not economically feasible.

As is well known, manganese ore usually contains manganese in the form of manganese dioxide which is relatively insoluble in $H_2SO_4$ and consequently, normal leaching operations require some change in state of the manganese prior to the leaching step. Recently, considerable development work has been done employing the reduction roasting of manganese ore followed by a sulfuric acid leaching to extract the manganese from its ores. Such reduction roasting has been done in many types of furnaces using carbonaceous fuel as a reducing agent, whereby relatively high costs are again encountered.

It is, therefore, a general object of this invention to provide an improved method for reducing manganese ores.

It is a more particular object of this invention to provide a method of reducing manganese ores employing a sulfur medium both as a fuel and as a reducing agent.

It is still another object of this invention to provide a method of reducing manganese ores using pyrite as a sulfur medium for both the fuel and reducing agent whereby not only is the manganese reduced but a commercial grade magnetite is likewise produced.

It is a further object of this invention to provide a reduction of manganese ores as set forth above and to further provide sulfuric acid as a by-product of said reduction.

It is another object of this invention to reduce manganese ores and produce sulfuric acid, as set forth above and further using the sulfuric acid so produced to leach the reduced manganese oxide to form manganese sulphate.

It is still a further object of this invention to upgrade manganese ores including manganese dioxide by first reducing the same using a sulfur medium and making sulfuric acid as a by-product and subsequently, leaching the reduced manganese oxide with the produced sulfuric acid and subsequently decomposing the manganese sulphate so leached to produce a high grade concentrate of manganese oxide.

These and other objects and features of the invention will become more clearly apparent upon a review of the following description in conjunction with the accompanying drawing, in which:

FIGURE 1 is a flow sheet diagram illustrating one major embodiment of the invention;

FIGURE 2 is a flow sheet diagram showing another embodiment of the invention;

FIGURE 3 is a flow sheet diagram in accordance with an embodiment of the invention showing the production of dry manganese sulphate from the pregnant solution of the same, from either of the flow sheets shown in FIGURES 1 or 2;

FIGURE 4 is a flow sheet showing the production of concentrate manganese oxide from the pregnant solution of manganese sulphate shown in either FIGURES 1 or 2; and FIGURE 5 is a flow sheet showing the production of $MnO_2$ or electrolytic manganese from the pregnant solution of manganese sulphate shown in either FIGURES 1 or 2.

In each of the embodiments shown in the invention by the flow sheets, it is noted that the sulfur medium is a pyrite ore, however, as will be obvious from certain tables hereinafter, other sulfur mediums such for instance, as elemental sulfur may be substituted for the pyrite. Pyrite has a particular advantage, however, in that during the magnetic roasting not only is the manganese ore reduced but also magnetite is produced as a commercial product.

Referring to FIGURE 1, manganese ore and pyrite ore are combined and fed to a furnace where they are partially roasted. The partial roast in this sense infers only a partial reduction of the manganese ore whereby manganese oxide of the group consisting of $MnO$, $Mn_3O_4$, and $Mn_2O_3$, are produced. At the same time the iron from the pyrite combines with the oxygen from the manganese ore to produce magnetic iron oxide $Fe_3O_4$. During the course of roasting off-gases in the form of sulfur dioxide are formed and are used to produce sulfuric acid. The production of sulfuric acid and the apparatus for the same are so well known in the art that further discussion seems unnecessary. However, basic steps for producing sulfuric acid are indicated in the flow sheets of FIGURES 1 and 2.

The calcine from the partial roasting step in accordance with the embodiment shown in FIGURE 1, is passed to a magnetic separator and $Fe_3O_4$ is parted from the manganese oxide which is acid soluble. The roasting may be done in a fluidized bed roaster, for example, and the calcine may include not only the overflow product but also the solid product, separated from the off-gas.

After magnetic separation, the magnetic $Fe_3O_4$ is in the form of a commercial product and can be sold as such. The acid soluble manganese, however, is further processed in a leaching step wherein the sulfuric acid produced from the off-gas sulfur dioxide performs the leaching. Such leaching, of course, produced a pregnant solution of manganese sulphate as well as a residue gangue. Thus it is seen in FIGURE 1, from the combination of a manganese ore and a pyrite ore, a commercial product in the form of magnetic concentrate $Fe_3O_4$ is produced. Also produced as a commercial product is an excess of sulfuric acid which is not required in the leaching step. The pregnant solution of manganese sulphate may be further processed to produce other commercial products as will be seen hereinafter.

Referring to FIGURE 2, an alternative embodiment of the invention is shown which is similar to that of FIGURE 1, except, however, that the calcine from the roasting step is leached prior to the separation step. Thus from the leaching step a pregnant solution of manganese sulphate is produced. The residue from the leach includes not only gangue but a substantial amount of magnetic $Fe_3O_4$. The iron oxide is then magnetically separated from the gangue. Here again, it is seen that in addition to the $Fe_3O_4$ as a commercial product an excess of the sulfuric acid produced from the acid plant may also be used as a commercial product.

The advantages of the embodiment shown in FIGURE 1 over the embodiment of FIGURE 2 and vice versa, depends substantially on the types of ore employed and the desired product. In instances where the manganese ore includes substantial quantities of iron oxide the embodiment of the invention shown in FIGURE 2 would be more beneficial since the iron oxide in the manganese ore would likewise be turned into magnetic $Fe_3O_4$. In such a case the portion of the magnetic $Fe_3O_4$ will be physically joined to the manganese to produce manganese oxide and the magnetic separation would cause a substantial amount of the manganese to be transferred with the iron oxide. Even with substantial amounts of iron oxide in the manganese ore, the embodiment shown in FIGURE 1 may be advantageous if the manganese ore is crushed finely prior to the magnetic separation whereby the major portion of the iron oxide will be physically separated from the manganese.

In general, the embodiment shown in FIGURE 1 produces a pregnant solution of manganese sulphate having less iron content than would the embodiment shown in FIGURE 2.

Referring to FIGURE 3, it is noted that the pregnant solution of manganese sulphate, as developed in either of the embodiments shown in FIGURES 1 and 2, may be converted into a commercial product merely by an evaporation step whereby dry manganese sulphate is produced. Referring to FIGURE 4, the pregnant solution of manganese sulphate may be further treated to produce a high grade manganese oxide whereby the overall process would serve to upgrade the manganese oxide. By controlling the atmosphere in the roast any of the manganese oxides $Mn_2O_3$, $Mn_3O_4$ or $MnO$ may be produced. Battery grade $MnO_2$ or electrolytic manganese may be formed by subjecting the pregnant solution of $MnSO_4$ to an electrolysis step.

Dry manganese sulphate is a well known commercial product in the fertilizer industry, while the manganese oxides are well known commercial products in other inductries. Manganese dioxide may be used in the manufacture of batteries. Either of the oxides $MnO$, $Mn_2O_3$ or $Mn_3O_4$ find commercial use in the steel industry and may be converted into the well known alloy ferromanganese. These oxides also may be used to produce a high grade purified manganese metal.

In accordance with the invention the process has been carried out and following are examples of such process. In each of the examples a manganese ore assaying at 24.95% manganese and 2.0% iron was employed. The ore was soft and stage crushed to −20 mesh. The manganese occurred as manganese dioxides disseminated in a siliceous gangue with minor amounts of limestone. The pyrite employed in the example assayed at 47.925% sulfur, 43.6% iron and 0.32% copper and 0.25% zinc. The size of the pyrite was also −20 mesh. Sulfur employed for the tests assayed at 99.5% sulfur. Each of the tests employed a four inch FluoSolids reactor to perform the roasting. Further particulars of the tests and the results obtained therefrom are shown below in the following tables.

Table I, below, shows the data developed during the course of the partial roasting step, including the amounts of feed and the amounts of the output products.

TABLE I.—DATA FROM PARTIAL ROASTING STEP

| Feed | Example #1 | Example #2 |
|---|---|---|
| Manganese Ore (grams) | 13,675 | 9,123 |
| Pyrite (grams) | 4,825 | |
| Elemental Sulfur (grams) | | 2,138 |
| Product From Magnetic Roast: | | |
| Overflow (calcine) | 13,140 | 7,061 |
| Cyclone and Sock | 2,792 | 1,446 |
| Gas Analysis, Percent: | | |
| $SO_2$ | 19.4 | 20.4 |
| $SO_3+CO_2$ | 2.4 | 1.2 |
| $O_2$ | 0.0 | 0.0 |
| Temp. in Mag. Roast (° C.) | 700–829 | 561–708 |
| Air input to Mag. Roast (Cu. ft./min.) | 1.20 | 1.60 |
| Space Rate (feet/sec.) | 1.01 | 1.20 |
| Length of Run (min.) | 184 | 156 |

Samples of the overflow cyclone and sock products were collected during the run and composites from Example 1 were subjected to magnetic separation employing a standard Davis tube.

Table 2 not only shows the percentage weight of the product which is magnetic and non-magnetic but also the assay of the iron and manganese in both the magnetic and non-magnetic products. Moreover, Table 2 shows the distribution of the total iron and total manganese in each of the magnetic and non-magnetic products.

TABLE II.—ANALYSIS OF MAGNETIC SEPARATION OF PRODUCT FROM EXAMPLE #1

| | Weight percent | Assay, percent | | Percent distribution | |
|---|---|---|---|---|---|
| | | Fe | Mn | Fe | Mn |
| Magnetics | 22.44 | 56.0 | 7.02 | 87.11 | 7.32 |
| Non-Magnetics | 77.56 | 2.4 | 26.02 | 12.89 | 92.68 |

Moreover, separate samples of the overflow, cyclone and sock products from Example #2 were subjected to leaching in water and in sulfuric acid solutions. The sulfuric acid solution included 1300 milliliters of water together with 100 grams of $H_2SO_4$. The results of such leaching are shown below in Table III.

TABLE III.—RESULTS FROM LEACHING COMPOSITE PRODUCT OF EXAMPLE II

| | Weight Percent | | Filtrate Assay, grams per liter Mn |
|---|---|---|---|
| | Feed | Residue | |
| Water Leach | 100 | 99.0 | 0.216 |
| Acid Leach | 100 | 87.0 | 41.175 |

Two tests were run on samples of the overflow, cyclone and sock product from Example No. 1, which employed both magnetic separation and acid leaching. In test No. 1 1,681 grams of this composite were ground for twenty-five minutes in a rod mill. The ground pulp was magnetically separated in a Steffensen magnetic separator set at one ampere. The magnetic concentrate was run through the magnetic separator one additional time and then dried, weighed and assayed. The nonmagnetic tails were leached for 1.5 hours at approximately three to one dilution with 625 grams of sulfuric acid. Agitation was provided by an electric stirrer. Sulfuric acid was added slowly to maintain pH of 2.0 to 3.0. The addition of acid was discontinued when the pH indicated the consumption of acid was almost complete. Following the leach, the pulp was filtered and the pregnant solution assayed for manganese, iron and copper. The leach residue was washed four times in the filter with one thousand milliliters of five grams per liter $H_2SO_4$ and twice with 500 milliliters of tap water. The residue was dried, weighed and assayed for iron, manganese and copper, and the wash solution was similarly assayed.

In test No. 2, 2,000 grams of the composite from Example No. 1 were leached for one hour in a 3:1 dilution.

834 grams of $H_2SO_4$ were added slowly as the slurry was agitated. The final pH was approximately 2.0. The pulp was filtered and the pregnant solution was neutralized with $Ca(OH)_2$ to an approximate pH of 5.0. The pregnant solution was assayed for iron, manganese and copper. The leach residue was run through a Steffensen magnetic separator set at one ampere. Magnetic concentrates were ground for ten minutes and two staged through the magnetic separator. Magnetics and non-magnetics were dried, weighed and assayed for manganese, iron and copper. The results of each of these tests are shown in the following Table IV.

TABLE IV.—MAGNETIC SEPARATION AND $H_2SO_4$ LEACHING
[Test No. 1.—Magnetic separation followed by $H_2SO_4$ leaching]

| Product | Wt. Percent | Assay, Percent | | | Distribution, Percent | | |
|---|---|---|---|---|---|---|---|
| | | Fe | Mn | Cu | Fe | Mn | Cu |
| Magnetics | 23.1 | 54.0 | 11.47 | 0.296 | 81.97 | 11.76 | 57.47 |
| Non-Magnetics | 49.3 | 3.6 | 2.10 | 0.088 | 11.71 | 4.57 | 36.47 |
| Solution (assays in grams per liter) | 27.6 | 3.4 | 96.12 | 0.55 | 6.32 | 83.67 | 6.06 |

[Test No. 2.—$H_2SO_4$ leaching followed by magnetic separation]

| Product | Wt. Percent | Fe | Mn | Cu | Fe | Mn | Cu |
|---|---|---|---|---|---|---|---|
| Magnetics | 16.1 | 64.0 | 3.45 | 0.266 | 67.76 | 1.55 | 35.97 |
| Non-Magnetics | 51.8 | 2.6 | 6.15 | 0.107 | 8.81 | 14.15 | 46.55 |
| Solution (assays in grams per liter) | 32.1 | 14.4 | 119.07 | 0.130 | 23.43 | 84.30 | 17.48 |

In order to emphasize the advantages of applicants' invention, a controlled leach was run on unroasted mixture of pyrite and manganese ore. A 100 gram sample of the mixture was leached for two hours with 300 milliliters of water and thirty-eight grams of sulfuric acid. The leach pulp was filtered, washed, dried, weighed and assayed for iron and manganese. The results of the test are shown in Table No. V.

TABLE V.—LEACH TEST ON UNROASTED PYRITE AND MANGANESE ORE

| | Weight | | Assay, Percent | | Distribution, Percent | |
|---|---|---|---|---|---|---|
| | Gram | Percent | Fe | Mn | Fe | Mn |
| Residue | 96.1 | 96.1 | 11.6 | 18.65 | 84.47 | 92.17 |
| Solution | | | | | 15.53 | 7.83 |
| Feed | 100.0 | 100.0 | 13.2 | 19.44 | 100.00 | 100.00 |

In view of the above examples and tables, it is apparent that while attempting to leach manganese ore prior to roasting only 7.83% of the manganese is available in solution. On the other hand, by using the roasting steps as set forth in the invention, it is noted from Table No. IV, that better than 80% of the manganese is available in solution for further processing into a commercial product.

Solutional tests were employed showing the production of manganese oxide wherein 4,000 milliliters of the saturated solution from Test No. 2, shown in Table No. IV. were dried in a glass beaker to 5% moisture and subsequently roasted in air. The roast was accomplished in a standard electric muffle furnace at 1,000° C. Under such conditions $Mn_2O_3$ and $Mn_3O_4$ were produced.

Thus, it is seen that a highly efficient and economical process has been devised not only for reducing manganese ore but for upgrading the ore for commercial use.

In order to produce MnO the atmosphere during roasting and cooling is controlled such that the product is subjected to an oxidizing while roasting until sulfur is removed and is subject to a reducing atmosphere while cooling.

We claim:
1. In a method for separating the manganese values from a manganese dioxide bearing ore, the steps of combining pyrite with such ore, partially roasting the combined pyrite and ore in a reducing, oxygen limited atmosphere so that the ore and pyrite react to produce a calcine containing MnO, $Mn_2O_3$ and $Mn_3O_4$, magnetite, and gases containing sulphur dioxide, the roasting step utilizing the pyrite as fuel to liberate heat for the reaction, converting said sulphur dioxide gas to sulphuric acid, and leaching the calcine with sulphuric acid to dissolve the manganese oxides to form manganese sulphate.

2. The method as defined in claim 1 together with the step of applying magnetic separation to the residue from the leaching step to isolate the magnetite from the gangue.

3. The method as defined in claim 1 together with the step of magnetically separating the magnetite from the calcine prior to the leaching step so that only that portion of the calcine remaining after magnetic separation is subjected to the leaching step.

4. The method as defined in claim 1 together with the step of roasting the manganese sulphate formed in the leaching step to produce manganese oxides therefrom.

References Cited
UNITED STATES PATENTS 1,562,942 11/1925 Coolbaugh et al. ____ 23—117 X
2,737,441 3/1956 Nossen _____ 23—117 X
2,984,545 5/1961 Tarbutton et al. ____ 23—117 X EARL C. THOMAS, *Primary Examiner.*

OSCAR R. VERTIZ, *Examiner.*